United States Patent
Pellenc

(10) Patent No.: US 9,265,197 B2
(45) Date of Patent: Feb. 23, 2016

(54) ROTARY CUTTING HEAD USING WIRE-SHAPED FLEXIBLE CUTTING ELEMENTS, AND CUTTING DEVICES COMPRISING SUCH A CUTTING HEAD

(75) Inventor: Roger Pellenc, Pertuis (FR)

(73) Assignee: PELLENC (SOCIETE ANONYME), Pertuis (FR)

(*) Notice: Subject to any disclaimer, the term of this patent is extended or adjusted under 35 U.S.C. 154(b) by 686 days.

(21) Appl. No.: 13/639,163

(22) PCT Filed: Apr. 18, 2011

(86) PCT No.: PCT/FR2011/000231
§ 371 (c)(1),
(2), (4) Date: May 21, 2013

(87) PCT Pub. No.: WO2011/131858
PCT Pub. Date: Oct. 27, 2011

(65) Prior Publication Data
US 2013/0283623 A1 Oct. 31, 2013

(30) Foreign Application Priority Data
Apr. 21, 2010 (FR) .................................. 10 01691

(51) Int. Cl.
*A01D 34/416* (2006.01)
(52) U.S. Cl.
CPC .......... *A01D 34/4166* (2013.01); *A01D 34/416* (2013.01)
(58) Field of Classification Search
CPC ...................... A01D 34/416; A01D 34/416
USPC ................ 30/276, 347; 56/17.2, 295, 12.7
See application file for complete search history.

(56) References Cited

U.S. PATENT DOCUMENTS

| | | | | |
|---|---|---|---|---|
| 4,989,321 A | * | 2/1991 | Hoffmann | A01D 34/4162 30/276 |
| 6,347,455 B2 | * | 2/2002 | Brant | 30/276 |
| 6,519,857 B1 | * | 2/2003 | Proulx | A01D 34/416 30/276 |
| 7,257,898 B2 | * | 8/2007 | Iacona | A01D 34/416 30/276 |
| 8,028,424 B2 | * | 10/2011 | Legrand | A01D 34/4166 30/276 |
| 8,176,639 B2 | * | 5/2012 | Doane | A01D 34/416 30/276 |
| 8,341,847 B2 | * | 1/2013 | Kato | A01D 34/416 30/276 |

FOREIGN PATENT DOCUMENTS

EP  1586857 A1  10/2005

OTHER PUBLICATIONS

International Search Report for corresponding International Application No. PCT/FR2011/000231.

* cited by examiner

*Primary Examiner* — Ghassem Alie
(74) *Attorney, Agent, or Firm* — Egbert Law Offices, PLLC

(57) ABSTRACT

A rotary cutting head adapted to allow a flexible strand of cutting wire to be inserted therein has a coupler for coupling the cutting head to a driveshaft of the motor, a support, and a clamping mechanism supported by the support in the rotary cutting head. The clamping mechanism is adapted to clamp the strand within the exterior housing. The clamping mechanism includes squeezing cams mounted so as to pivot in parallel planes therebetween and relative to the rotation axis of the cutting head. The support is axially translatable in the exterior housing. An application of actual movement in a direction opposite to the housing and the support causes a raising of the squeezing cams or a lowering of the squeezing cams.

5 Claims, 12 Drawing Sheets

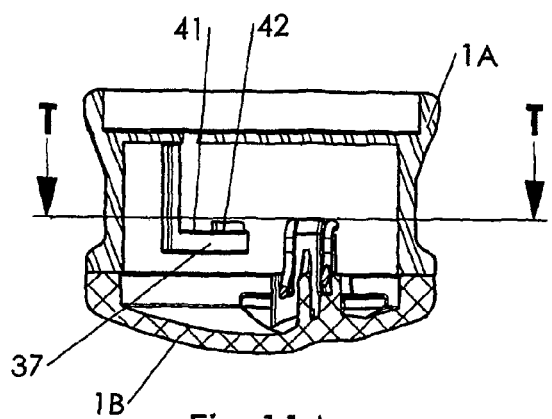
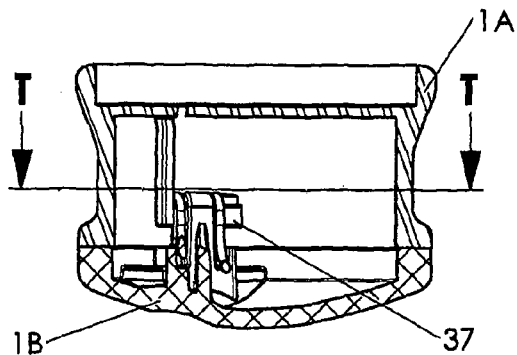
Fig 11A  Fig 11B
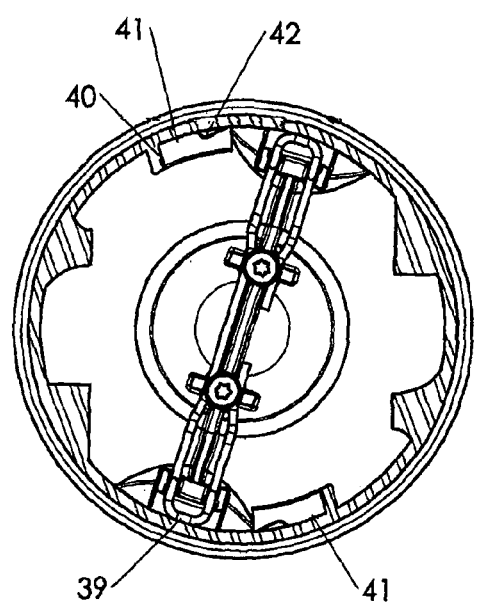
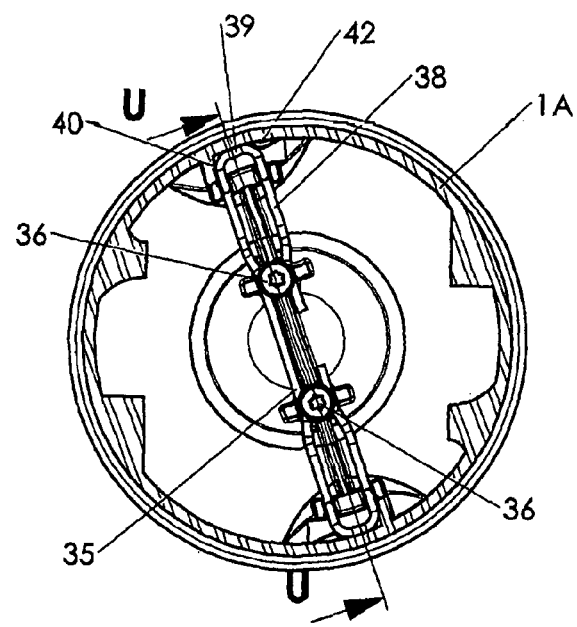
Fig 11C  Fig 11D

ROTARY CUTTING HEAD USING WIRE-SHAPED FLEXIBLE CUTTING ELEMENTS, AND CUTTING DEVICES COMPRISING SUCH A CUTTING HEAD

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention concerns a rotary cutting head using wire-shaped flexible cutting elements. It is advantageously intended for equipping portable cutting devices such as grass cutters, edge cutters, motorized brush cutters or mowers, hedge cutters and similar.

More precisely, the invention concerns a rotary cutting head using strands of flexible cutting wire constituted by lengths of wire, rods or slender sticks, made of any suitable material such as 'Nylon'® or other appropriate flexible material.

The invention concerns also portable cutting devices equipped with the cutting head disclosed in the description below.

2. Description of Related Art Including Information Disclosed Under 37 CFR 1.97 and 37 CFR 1.98

Motorized tools equipped with such cutting heads are currently used by professionals as well as private individuals. By way of examples documents US-2001/0023542, U.S. Pat. No. 6,401,344, U.S. Pat. No. 6,944,956, WO-2004/064489, WO-2005/032237, WO-2006/017372, WO-2008/139246, FR-2888085 are cited which describe various possible fittings of cutting heads using cutting elements constituted by strands of flexible cutting wires.

These cutting heads are mounted at the distal end of a handle equipped with a U-shaped handle or dual guide and control handle for the rotational drive motor of said cutting heads, and with a ring for attaching a carrying harness.

A cutting head of this kind supports one or several (most often two) wire-shaped cutting elements extending radially towards the outside, each cutting element presenting a predetermined limited length. The body of the cutting head features, laterally, at least one inlet opening for the engagement of a strand of cutting wire, and, in certain embodiments, at least one opposite opening for the removal of used or damaged cutting wire(s).

A clamping mechanism is housed in the body of the cutting head, this mechanism enabling, on the one hand, the driving in of one of the end portions of the cutting strands into the rotary cutting head, and, other hand, opposing the inverse movement of said strands which are thus locked in an active assembly position. This mechanism includes, most often, a toothed toggling cam subjected to the action of a pressure device.

According to document WO-2006/017372, each strand of cutting wire presents a predetermined length and can be squeezed, in a detachable manner, in an essentially closed chamber, by means of a squeezing mechanism including a mobile clamping element and a spring which tends to push said clamping element against the proximal end of the strand of cutting wire engaged in said chamber. A releasing element (special tool or screwdriver) is necessary to cooperate with the clamping element in order to move the latter away from the strand of cutting wire, to meet the antagonistic action exerted by the spring, in order to withdraw said strand of cutting wire from the cutting head.

In this case, to perform the replacement of a strand or the two cutting strands that are used or damaged, appropriate tools need to be available in order to proceed successively to the neutralization of the springs maintaining said strands in position. Besides being a constraining intervention which requires a certain knowledge and familiarity with the tool, this arrangement does not permit to modify the active length of the cutting strands while the device is being used, without going through the inconvenience pointed out above. Furthermore, the cutting strands cannot traverse the cutting head, because the axis or drive shaft providing the rotation of said cutting head passes through the middle of it. The operators are therefore obliged to use relatively short cutting strands, which increases the frequence of their replacement owing to wear.

Document US-2001/0023542 describes a cutting head provided with four side openings to allow the engagement and removal of four cutting strands. The proximal part of each of these strands is engaged in a closed chamber kept in position of active implantation by a dedicated clamping device for each strand. The control element of each clamping device is constituted by a sliding bar which is accessible from the upper face of the housing of the cutting head. Each clamping device is constituted by two horizontal cams subjected to the action of springs between which a strand of cutting wire can be engaged and squeezed. The clamping cams are punctually opened by activation of the sliding control bars placed on the upper part of the cutting head for the purpose of freeing the worn strand and or to allow insertion of a new strand. During the release of the sliding bars, the clamping cams come closer together to exert a squeezing action on the strand under the action of the spring.

Utilization of the cutting head described in this document leads to the same inconveniences as those pointed out previously concerning document WO-2006/017372, with, additionally, the inconvenience of a more complex fitting and utilization.

The length of the cutting strands is reduced, requiring consequently more frequent replacements of the worn strands. Two cams are necessary to block each cutting wire which increases the number of components and complicates the manufacture of the devices.

To remove the used wire, it is necessary:
- either to extract the wire from below and through the center of the head by simple traction, after having removed the sliding bowl;
- but one must have beforehand let a length of wire protrude, because otherwise this is impossible;
- the area where to seize the wire strand for the purpose of extracting it is subject to clogging;
- or actuate the control bar to unlock the cams;

unlocking is done wire by wire and each control bar must be actuated independently which causes a loss of time;

the control bars are of small dimensions and therefore difficult to manipulate while wearing gloves;

moving the control bars relative to the exterior bell of the cutting head requires some play and thus a risk of clogging and binding.

Document U.S. Pat. No. 6,401,344 describes a cutting head of a brush cutter.

This cutting device uses a traversing single strand wire and as such generates a significant loss of wire (the entire center of the head). If the wire breaks on one side of the head, it is obligatory to replace all of it. The unlocking bars are located at the outside, and hence subject to clogging.

The locking mechanism, in active position, of the single strand of cutting wire in the cutting head is constituted by a complex system of squeezing range which does not allow an automatic locking of the cutting wire, in this position.

The devices described in the documents above, and generally speaking, all cutting heads of the state of the art using flexible cutting strands, have these disadvantages:

the difficulty, or even in certain cases, the impossibility of making adjustments to the length of the cutting strands depending on the work to be done;

the time needed for removing worn cutting strands and for their replacement, because it is obligatory to wear gloves which complicates the manipulations;

clogging of exterior control devices for unlocking the blocking means of the cutting strands;

the need for having available a tool for opening the cutting head and unlocking the worn or damaged cutting strands.

BRIEF SUMMARY OF THE INVENTION

One objective of the present invention is to remedy the aforementioned disadvantages or, at least to significantly diminish the degree of constraints they impose.

According to the invention, this objective is achieved thanks to a cutting head comprising an exterior housing and using two flexible cutting strands that are implantable inside said cutting head, so they can extend radially toward the outside of the latter through orifices made in the side wall of its exterior housing which features, on the one hand, a coupling means to the drive shaft of a motor, and, on the other hand, a strand-holding assembly integral in rotation of said exterior housing and supporting a clamping mechanism of the cutting strands that is engaged inside said exterior housing, this cutting head being particularly remarkable in that the clamping mechanism features squeezing cams mounted so they can pivot in parallel planes between them and to the rotational axis of the cutting head, and in that this strand-holding assembly is mounted with an aptitude of axial translation in the exterior housing of the cutting head, this housing and said clamping mechanism being fitted in complementary fashion, so that the simultaneous application of a relative axial movement in the opposite direction to said exterior housing and to said strand-holding positioning allows:

either to raise the squeezing cams so the cutting strands can be positioned or removed, or to lower said cams to achieve the blockage of the cutting strands in the cutting head.

Advantageously, the simultaneous application of convergent axial movements to the housing and the strand-holding assembly lodged inside this housing is used to enable the squeezing cams to rise, thereby permitting the introduction, sliding or positioning of the cutting strands inside the cutting head, whereas the simultaneous application of divergent axial movements to said housing and said clamping mechanism support enables said cams to lower themselves so as to obtain the blocking of the active position of the cutting strands in the cutting head.

According to the invention, the convergent relative axial movements of the housing and the squeezing mechanism are obtained through the manual axial displacement of the exterior housing.

According to another characteristic disposition, the divergent relative axial movements of the housing and the strand-holding assembly which result in the locking of the cutting strands are obtained automatically through the action of an elastic means of return.

According to an interesting embodiment, this elastic means of return is constituted by a spring acting in compression and interposed between an interior partition in the upper part of the exterior housing and the support of the clamping mechanism, so as to allow the automatic blockage of the cutting strands following their positioning in the cutting head.

According to an advantageous embodiment, the support of the clamping mechanism comprises two guiding and positioning channels for the cutting strands, located in parallel on either side of the rotational axis of the cutting head, an inlet portion of each of these channels is uncovered, and the pivoting squeezing element of each squeezing device is mounted opposite this uncovered portion. Preferably, each of these squeezing elements is constituted by a cam featuring a squeezing surface and a lateral shoulder presenting a cam-shaped profile.

According to a preferred embodiment, the drive shaft and the axial passage made in the support of the clamping mechanism present a complementary profile that is adapted to allow the rotational drive of the cutting head.

The cutting head according to the invention provides several interesting advantages.

It is very simple to manufacture and to use. The insertion of the cutting strands, their adjustment depending on the mowing or brush-cutting work to be performed, their retraction and their replacement due to wear or breakage can be done very easily and very quickly and do not require any tooling, no matter how basic.

As it is possible to manually unlock the cutting strands, they can be removed on the same side as the one which served for their insertion into the cutting head. This necessarily avoids having to let the strands stick out, on the opposite side of the orifice reserved for their insertion, which allows shortening the length of the dropped pieces (worn or broken strands).

It is thus possible to use longer cutting strands than those used for equipping the known machines. The operator can, after partial wear of the wire, easily unlock said wire from its first position and make it come out in reverse direction of its direction of insertion to compensate for said wear and to optimize the drop-offs of wire no longer usable (in the known machines the drop-offs are significant because a not negligible portion of the length of cutting strands cannot be used). This saves wire and time as wires are replaced less often.

The peripheral wall of the exterior housing is provided with openings for the insertion of cutting strands and openings for extraction that are opposite to them and, according to an advantageous embodiment, these openings present an elongated shape oriented parallel to the rotational axis of the housing.

The elongated shape of these openings or lateral slots makes it possible, during relative movements of the exterior housing with respect to the support of the clamping mechanism, that said movements are not blocked by the cutting strands when these are engaged in the cutting head.

According to another characteristic disposition, the cutting head features an axial drive shaft that is suitable for being coupled to a motorization, this drive shaft being integral in rotation of the support of the clamping mechanism.

According to an interesting embodiment, the exterior housing and the support of the clamping mechanism are integral in rotation.

According to a preferred embodiment, the rotational drive of the exterior housing is achieved through the intermediary of the support of the clamping mechanism.

According to a preferred embodiment, the rotational coupling of the support of the clamping mechanism and the exterior housing is achieved by means of drive studs integral with the interior partition of the exterior housing and oriented parallel to the rotational axis of the cutting head, these drive studs being engaged, with an aptitude of sliding in the grooves made in the support of the clamping mechanism, preferably in at least two opposing sides of the latter.

According to a characteristic disposition, the clamping mechanism comprises two squeezing devices for the cutting strands positioned on both sides of the axial drive shaft, each enabling the positioning and locking of a cutting strand.

According to an advantageous embodiment, the support of the clamping mechanism is provided with two positioning channels of the cutting strands, located parallel, on both sides of the axial drive shaft of the cutting head, and of which at least one inlet portion is uncovered, the swinging component (cams, preferably) of the squeezing devices being mounted so they face this open portion and are subjected to the action of a spring tending to apply its active surface in direction of said uncovered portion, so as to press the cutting strand engaged in the positioning channel against the bottom of the latter, thus ensuring the blockage of said cutting strand, the exterior housing being provided, internally, with pushing fingers to make said cams pivot in order to remove the pressure of these on the cutting strands during convergent axial movements of the exterior housing and of the strand-holding positioning.

BRIEF DESCRIPTION OF THE DRAWINGS

The above characteristic dispositions and still more, will become clearer from the following description and the attached drawings in which:

FIG. 11A is a cross-section along line F-F of FIG. 10 with the lower part 1B of the lower housing unblocked.

FIG. 11B is a cross-section along line F-F of FIG. 10 with the lower part 1B of the lower housing blocked.

FIG. 11C is a cross-section and a plan view along line T-T of FIG. 11A.

FIG. 11D is an analog cross-section and a plan view along line T-T of FIG. 11B.

DETAILED DESCRIPTION OF THE INVENTION

Figure 1:
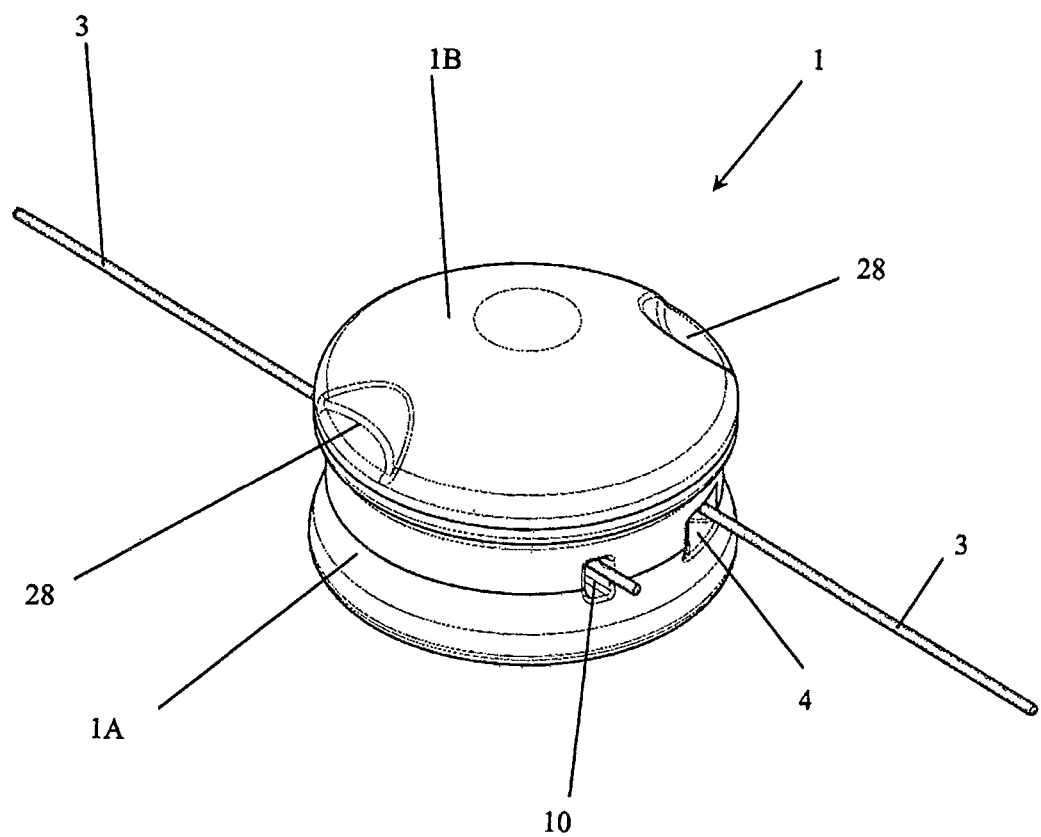
FIG. 1 is a perspective view of the cutting head using flexible strands of cutting wires, according to the invention.
Figure 2A:
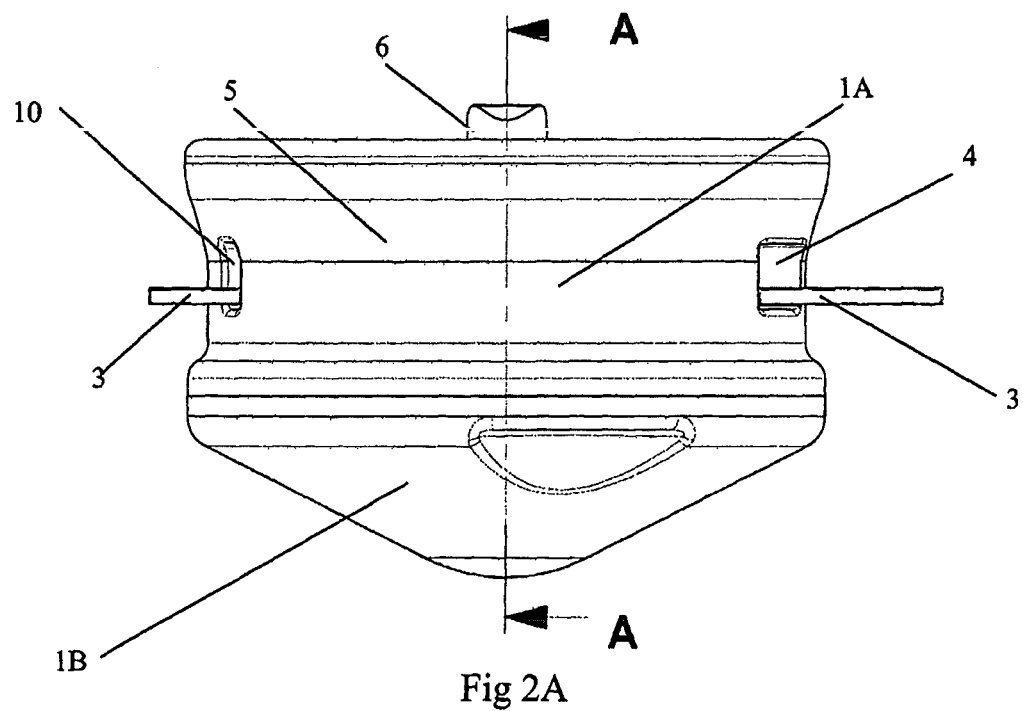
FIG. 2A is a side view of this cutting head equipped with cutting strands shown in the locked position.
Figure 2B:
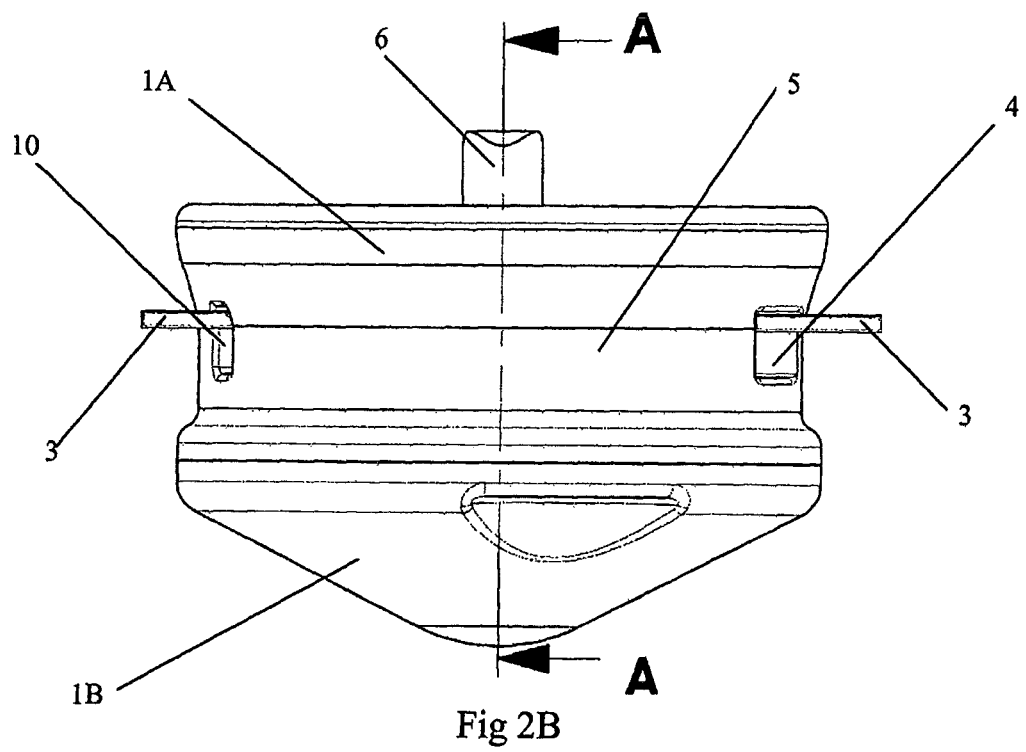
FIG. 2B is an analog view to FIG. 2A and where the cutting strands are shown in the unlocked position.

Reference is made to said drawings to describe interesting, although by no means limiting examples of embodiment of the cutting head according to the invention.

In the following disclosure and in the claims, words such as 'high', 'low', 'upper', 'lower', 'lateral', . . . are used in reference to the position of the cutting head in operation, in order to facilitate the description of the invention. These words therefore do not have any restrictive character.

To facilitate reading the description and the claims, it is specified that:
  the term 'exterior housing' designates the exterior hollow envelope of the cutting head;
  the expression 'support of the clamping mechanism' designates the mobile part which supports the squeezing elements;
  the expression 'clamping mechanism' designates the pairs of complementary squeezing elements for locking the cutting strands and their release;
  the term 'cam' designates the pivoting component of each squeezing device featuring a lateral shoulder presenting an active profile in the shape of a cam.

In a preferential construction, the cutting head according to the invention comprises an exterior envelope or housing 1 constituted by at least two parts, namely an upper part of a generally cylindrical shape 1A and a lower part of an essentially hemispherical shape 1B or approximately conical shape with a rounded vertex, called the 'sliding bowl', assembled in a removable manner at the bottom of the upper part. Inside this exterior housing is mounted a support of the clamping mechanism 2 supporting a clamping mechanism 16-17 into which can be inserted flexible or supple strands of cutting wire 3, through inlet openings 4, made in the side wall 5 of the exterior housing 1. These cutting wires 3 can be cut to the desired length or precut in different lengths; they may be made of Nylon® with different diameters (for example in the order of 2 to 4 mm) and with various sections (more or less round, square, star-shaped, twisted . . . ).

The support of the clamping mechanism 2 is integral in rotation of the exterior housing 1 and this assembly is subjected to a coupling means enabling it to be connected to the drive shaft of a thermal motor or preferably of an electric motor, or of a bell crank. This means is preferentially constituted by an axial shaft 6 extending on the outside in the upward direction, above a partitioning 7 provided at the upper part of the exterior housing.

According to the invention, the support of the clamping mechanism 2 is mounted with an aptitude of relative axial translation in the exterior housing 1 of the cutting head, the latter as well as said support being fitted in a complementary manner, so that the simultaneous application of a relative axial movement in the opposite direction of said exterior housing and said support results in:

- either the spreading of the complementary elements 16, 17, 17a, 17b of the clamping mechanism for positioning and removal of the cutting strands 3,
- or the joining of said elements 16, 17, 17a, 17b resulting in the blockage of the cutting strands 3 in the cutting head 1.

Figure 3A:
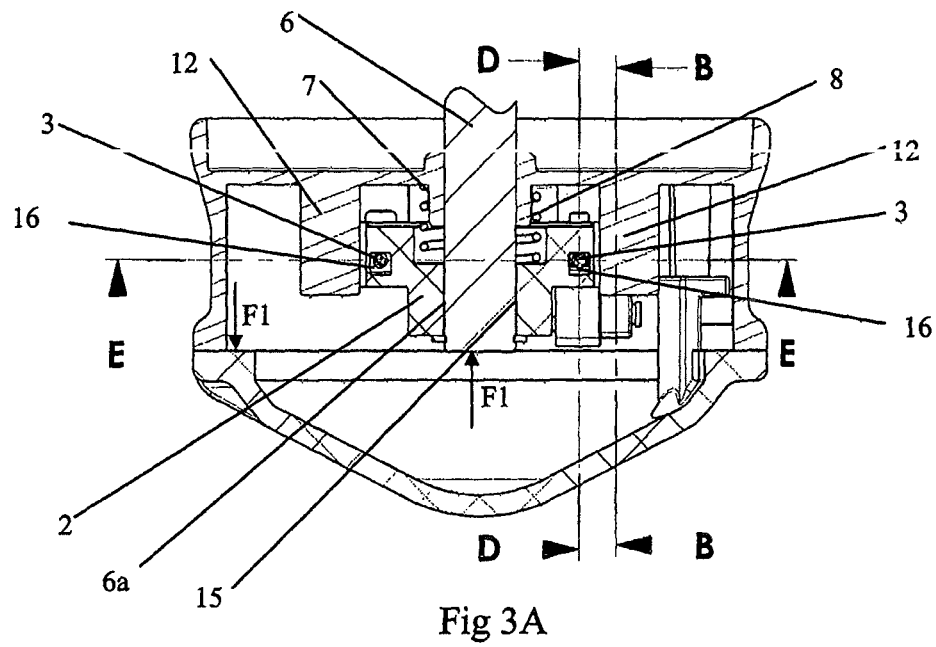
FIG. 3A is an axial section along line A-A of FIG. 2A.
Figure 3B:
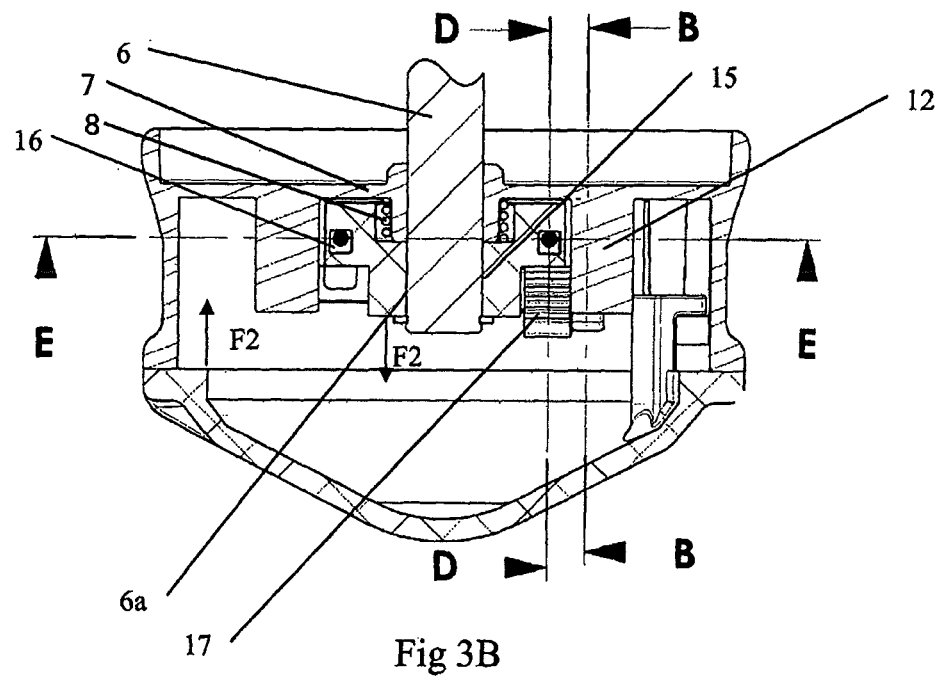
FIG. 3B is an analog axial section along line A-A of FIG. 2B.
Figure 4A:
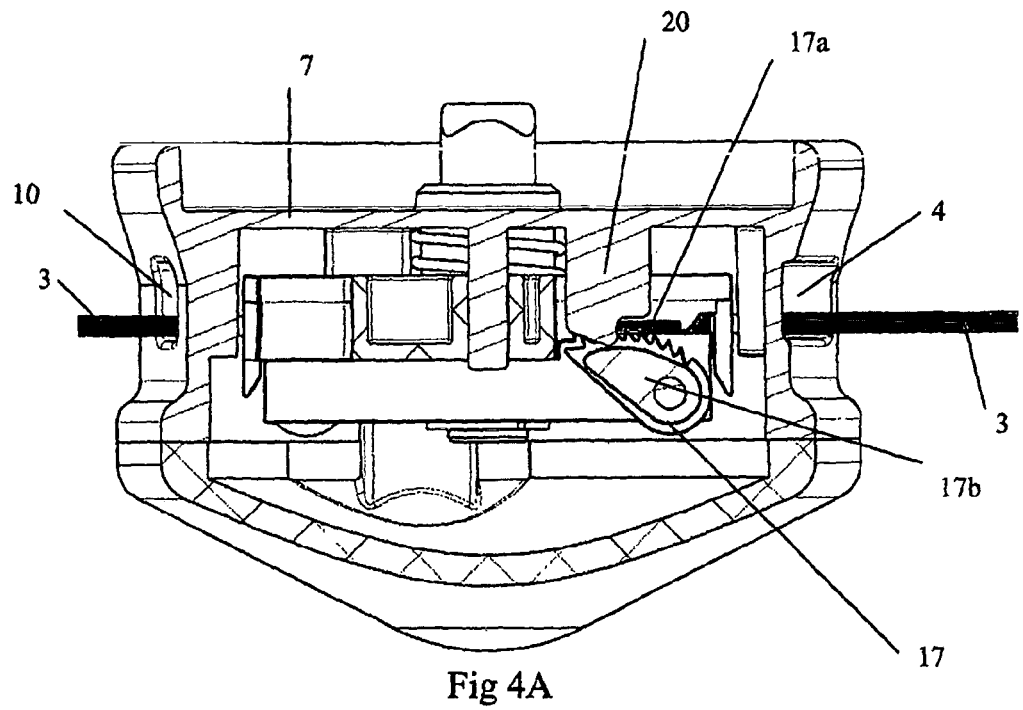
FIG. 4A is an axial section along line B-B of FIG. 3A.
Figure 4B:
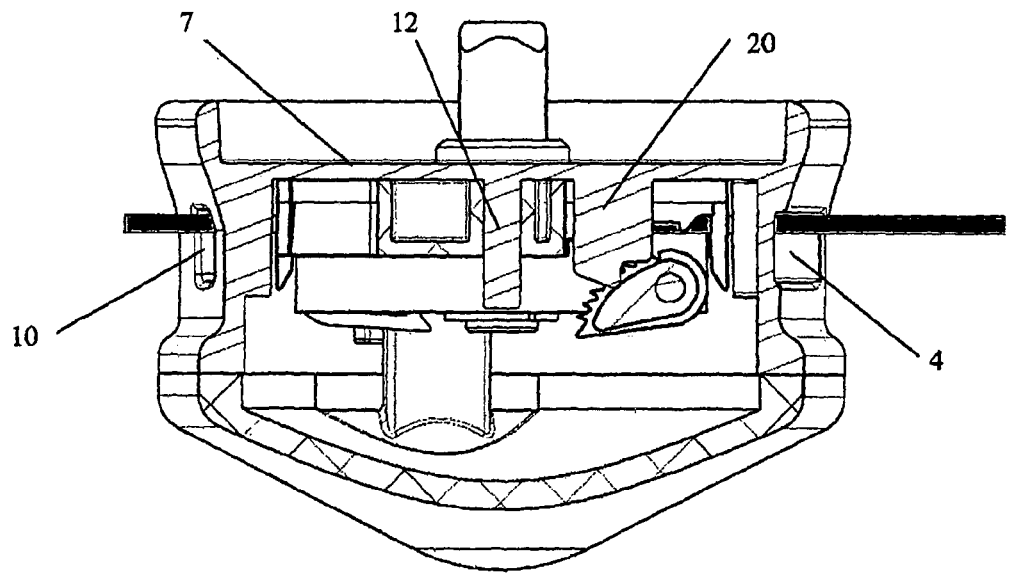
FIG. 4B is a cross-section along line B-B of FIG. 3B.
Figure 5A:
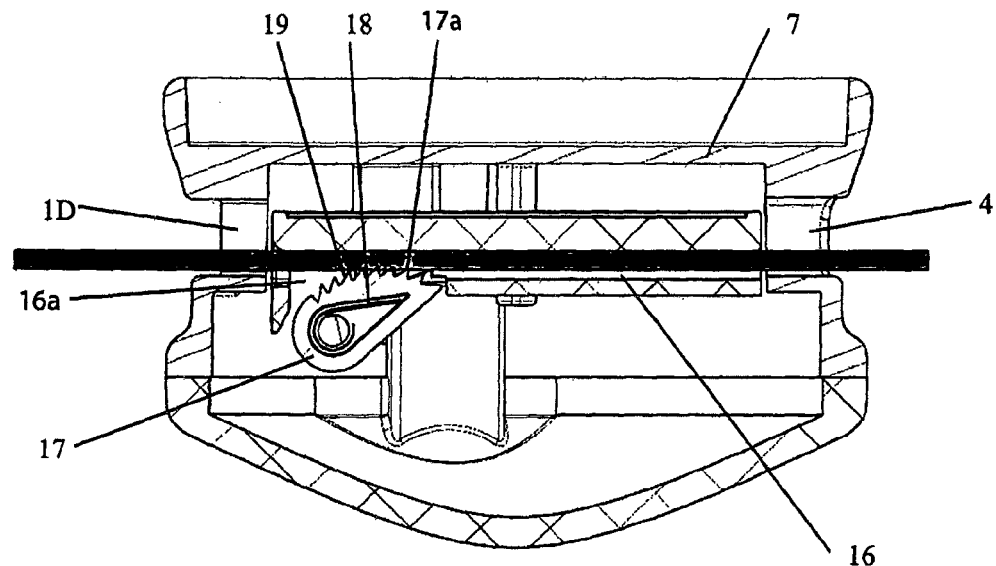
FIG. 5A is a cross-section along line D-D of FIG. 3A.
Figure 5B:
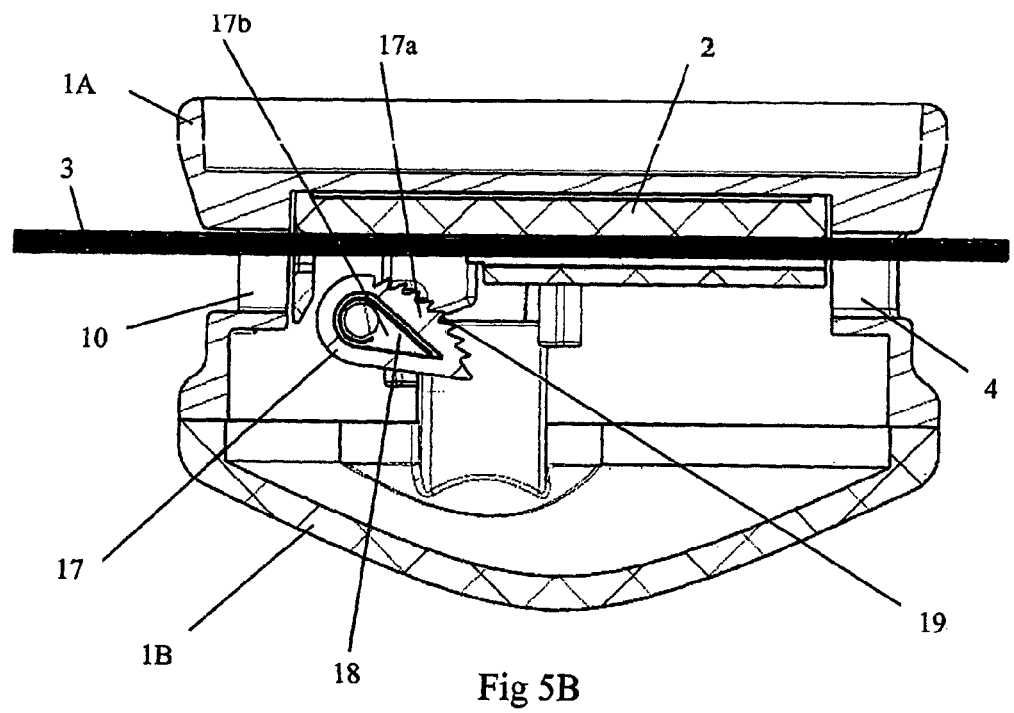
FIG. 5B is a cross-section along line D-D of FIG. 3B.
Figure 6:
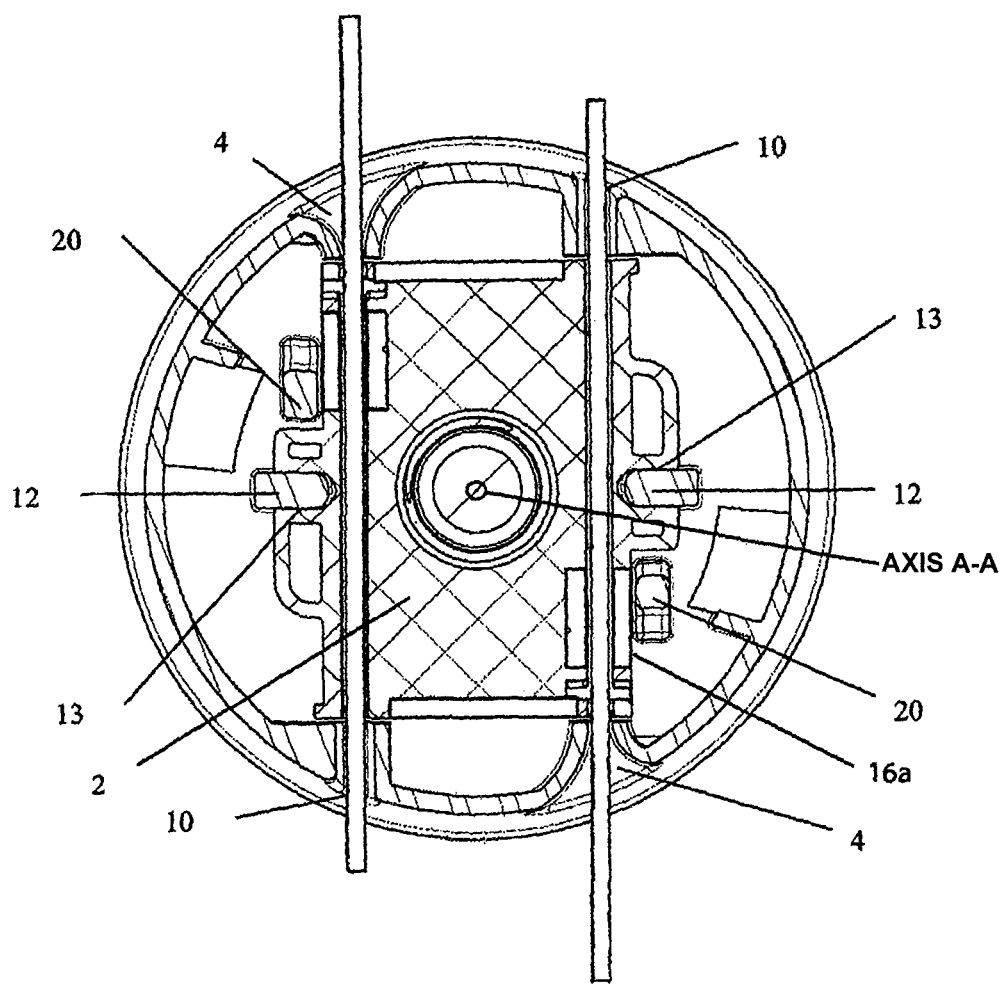
FIG. 6 is a cross-section and a plan view along line E-E of FIG. 3A.
Figure 8:
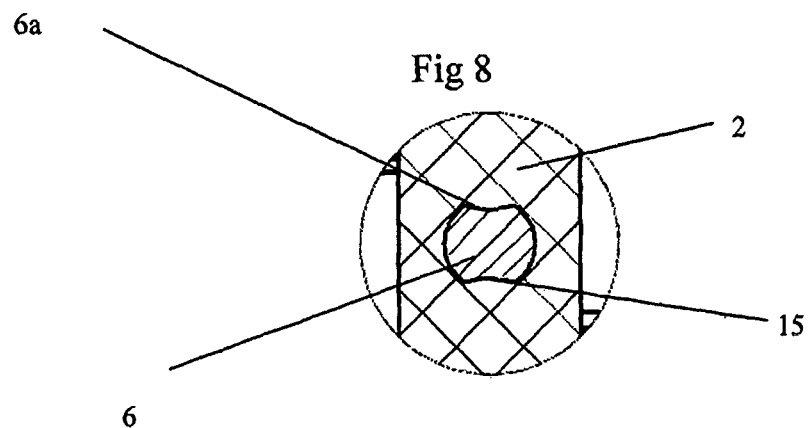
FIG. 8 is a detail vie and cross-section along line H-H of FIG. 7.
Figure 7:
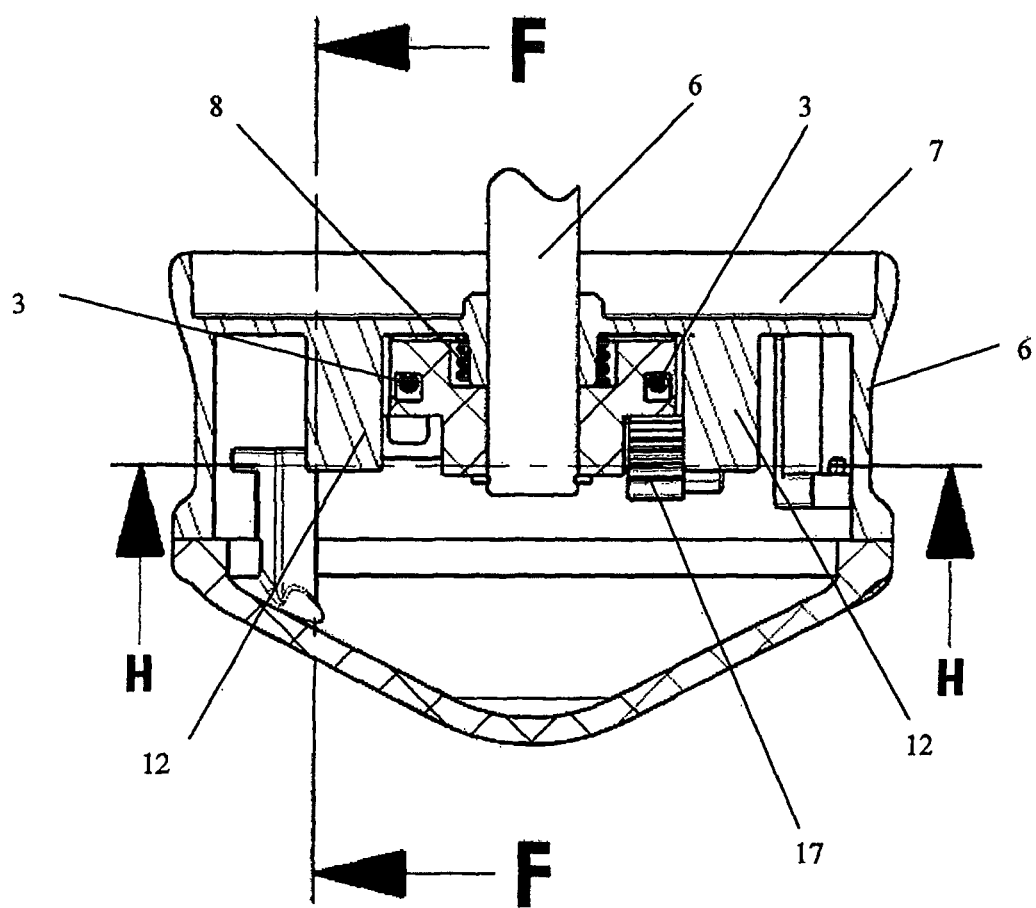
FIG. 7 is a detail view and axial section of the cutting head along line A-A of FIG. 2B in a first constructive disposition.
Figure 9A:
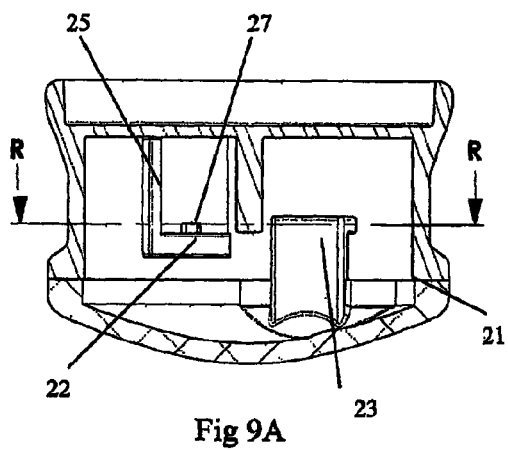
FIG. 9A is a cross-section along line F-F of FIG. 7 with the lower part 1B of the lower housing unblocked.
Figure 9B:
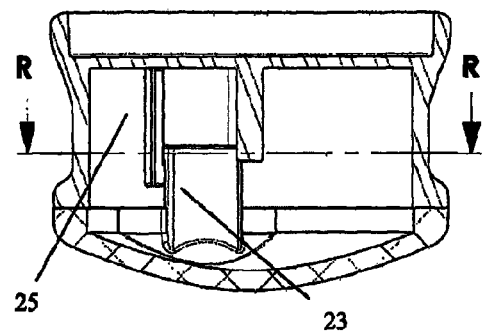
FIG. 9B is a cross-section along line F-F of FIG. 7 with the lower part 1B of the lower housing blocked.
Figure 9C:
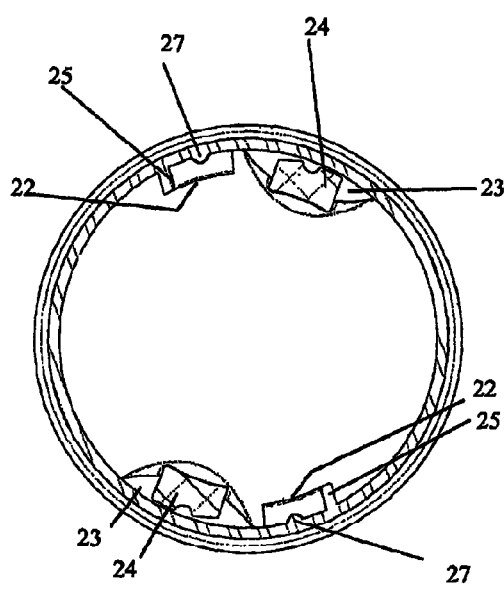
FIG. 9C is a cross-section and a plan view along line R-R of FIG. 9A.
Figure 9D:
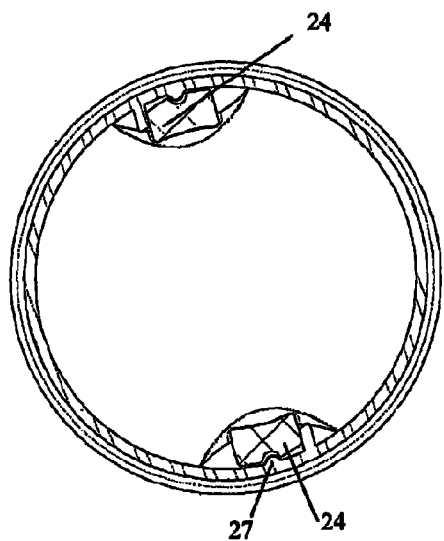
FIG. 9D is a cross-section and a plan view along line R-R of FIG. 9B.
Figure 10:
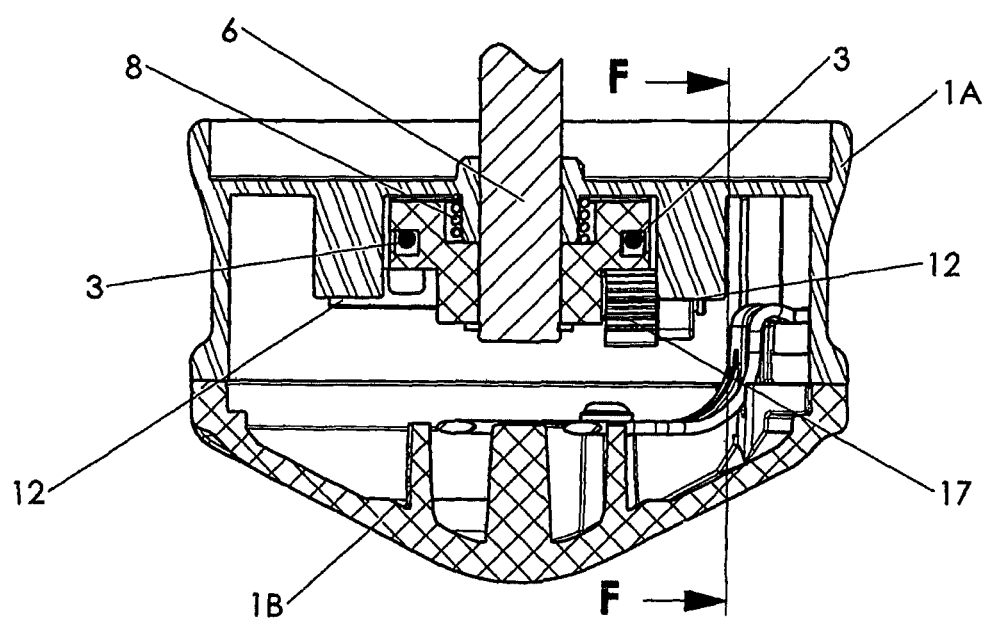
FIG. 10 is a detail view and axial section of the cutting head along line A-A of FIG. 2B in a second construction disposition.
Figure 12:
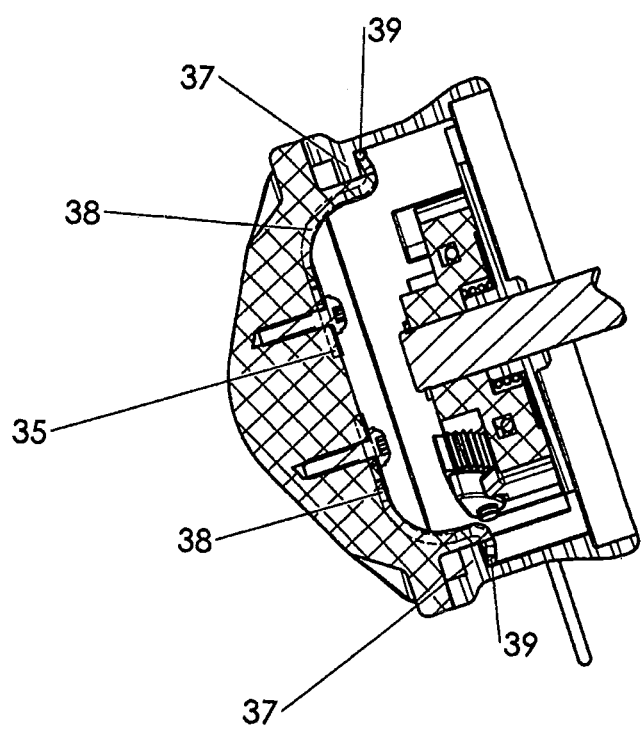
FIG. 12 is a cross-section following line U-U of FIG. 11D.

According to a preferred embodiment, the simultaneous application of convergent axial movements (arrows F1, FIG. 3A) to the exterior housing and support of the clamping mechanism 2 located inside this exterior housing is used to obtain the spreading of the clamping elements for the insertion of cutting strands 3 and their sliding inside the cutting head, whereas the simultaneous application of divergent axial movements (arrows F2, FIG. 3B) to said exterior housing and said support, allows the joining of the clamping elements, and then the blocking in active position of the cutting strands engaged in the exterior housing.

According to the invention, the relative convergent axial movements (arrows F1) of the exterior housing 1 and the support of the clamping mechanism 2 can be obtained by the application of a moderate manual force. More precisely the application of this manual force is obtained by the manual axial displacement of the exterior housing 1.

The relative divergent axial movements of the exterior housing 1 and the support of the clamping mechanism 2 which result in the locking of the cutting strands 3, are obtained automatically through the action of a means of elastic return.

According to a preferred embodiment, the elastic means of return is constituted by a spring 8 acting in compression and interposed between the inside partitioning 7 of the exterior housing and the support of the clamping mechanism 2, so as to allow the automatic return of said assembly into the blocking position of the cutting strands, after they have been positioned in the cutting head.

As previously indicated, the cylindrical side wall 5 of the exterior housing is provided with inlet openings 4 for the engagement and positioning of the cutting strands 3. Said side wall 5 is also provided with two openings 10 for the extraction of the worn or broken cutting strands, these extraction openings being located opposite the inlet openings 4, the openings 4 and 10 being aligned along parallel axes that are symmetrical and perpendicular to the rotational axis of the cutting head. The inlet openings 4 and the extraction openings 10 present an elongated shape the long axis of which is oriented parallel to the rotational axis A-A of the exterior housing. The inlet openings feature a convergent radiated entrance to promote guidance of the cutting strands during their engagement in the cutting head and to avoid their breakage during utilization.

These oblong openings 4, 10 make it possible, during the relative axial movements of the exterior housing 1 and the support of the clamping mechanism 2, not to jam, damage or cut the cutting strands 3 engaged in said openings and in which they can slide freely.

The exterior housing 1 and the support of the clamping mechanism 2 are integral in rotation, as previously indicated.

The support of the clamping mechanism 2 supports the mobile elements of the clamping mechanism installed on this support.

According to an embodiment, the coupling in rotation of the support of the clamping mechanism 2 and the exterior housing 1 is achieved by drive studs 12 integral of the internal face of the upper partition 7 or flange of the exterior housing 1 and oriented parallel to the rotational axis of the cutting head inside it, these drive studs 12 being engaged with an aptitude of sliding in the grooves 3 made in the support 2 of the clamping mechanism 16, 17, 17a, 17b, preferably in at least two opposite sides of said support, and, more precisely, in the large sides of the latter.

According to the example of embodiment shown, the drive shaft 6 traverses an axial passage 15 made in the support of the clamping mechanism 2; the traversing portion 6a of the shaft 6 and said axial passage 15 present a complementary profile adapted to enable the rotational drive of said support, and, consequently, thanks to the studs 12 and the grooves 13, of the exterior housing 1 of the cutting head, for example the axial passage presents a generally cylindrical shape and two longitudinal, diametrically opposed ribs, whereas the traversing portion 6A of the drive shaft 6 presents a complementary profile and in particular two longitudinal, diametrically opposed grooves in which said ribs can slide.

The support of the clamping mechanism 2 features two channels for guidance and positioning the cutting strands, located parallel on both sides of the axis A-A of the cutting head, and, for example, according to the embodiment shown, on both sides of the traversing portion 6a of the axial drive shaft 6 of the cutting head. An inlet portion 16a of each of these channels 16 is uncovered. A squeezing cam 17 featuring a clamping surface 17a and a lateral shoulder 17b presenting an active profile in form of a cam is mounted facing this uncovered portion, opposite of openings 4. These pivoting cams 17 of the clamping mechanism are mounted with an aptitude of pivoting in the parallel planes between them and parallel to the rotational axis A-A of the cutting head, and they are subjected to the action of a spring 18 or other elastic means of return, tending to apply their clamping surface or active surface in the direction of said uncovered portion, so as to push the cutting strand engaged in the positioning channel 16 against its bottom, thereby ensuring the blockage of said cutting strand. For better efficacy of the squeezing or clamping exerted by the cams 17, their active surface can be provided with teeth 19. These teeth are so oriented that the cutting strands can be withdrawn by traction exerted on their ends protruding from the extraction opening 10, while preventing any movement of the cutting strands in the opposite direction. However, it would also be possible to withdraw worn or damaged cutting strands by traction exerted on the cutting strands in a direction opposite to that of their insertion after having, of course, unblocked the squeezing devices in particular to provide the possibility of reducing the lengths of dropped cutting wire by using a portion of their part that previously traversed the cutting head.

On the other hand, the exterior housing is provided, on the inside, with pushing fingers 20 which extend in fixed position from the inside face of the upper partitioning 7 of the exterior housing 1, parallel to the rotational axis of the latter, and rest on the actuation profile 17b of the cams 17. These fingers enable said cams to pivot, in order to remove their pressure on the cutting strands, when the exterior housing 1 and the support of the clamping mechanism 2 are subjected to convergent forces of pressure tending to bring the upper partitioning 7 closer to the clamping mechanism 2.

The essentially hemispherical or approximately conical sliding bowl 1B with a rounded crown constituting the lower part of the exterior housing 1 can be assembled at the base of its upper part 1A by any convenient quick fastening element not requiring any tools. This sliding bowl allows the cutting head to be in contact with the ground, so as to facilitate the use of the devices equipped with this head, while keeping the cutting wires a few centimeters away from the ground.

Preferably, the low part of the side wall 1A of the exterior housing 1 and the circular upper part of the sliding bowl 1B are equipped with complementary retaining means the assembly of which requires a relative axial movement of the two parts, followed by a rotational movement of limited amplitude, in the sense of rotation of the tool to prevent its unlocking during the work phase, allowing the complementary elements of said retaining means to engage each other.

The rigid positioning of the upper part 1A and the lower part 1B of the exterior housing 1 can be achieved by means enabling the disposition of these parts if necessary.

In a first constructive solution (FIGS. 7, 9A, 9B, 9C, 9D) for example, the lower part can be embedded in the upper part and retained in it by means of flexible positioning tabs featuring a retaining nose hooking itself on to the lower edge of the base of the lower part.

The inside surface of the cylindrical side wall of the exterior housing 1A is for instance provided, near and along its circular lower edge 21, with at least two rounded shoulders 22 which, according to the shown embodiment, are diametrically opposed.

On the other hand, the sliding bowl 1B is provided with at least two diametrically opposed hooking tabs 23D extending parallel to its axis, and the free end of which is provided with a nose or locking pin 24 oriented in the direction of this axis.

During the rotation of the sliding bowl 1B following its axis, the noses or locking pins 24 come to rest on the rounded shoulders 22 whereby the movement of translation of said sliding bowl 1B is limited with respect to the upper part 1A of the exterior housing 1.

A stop 25 positioned at one of the ends of each shoulder 22 limits the rotational movement of the noses or locking pins 24 when the sliding bowl 1B is put into the assembly position.

On the other hand, the edge of nose 24 and the rounded shoulder 22 of the noses are equipped with complementary locking means, at the end of their rotational movement, during the positioning of the parts 1A and 1B of the exterior housing 1. These means may be constituted by a locking pin 26 featured on the upper face of the shoulders 22 and by a notch 27 provided in the exterior edge of the nose 24 and in which said locking pin engages at the end of the positional rotational movement.

In another constructive solution (FIGS. 10, 11A, 11B, 11C, 11D), the inside surface of the cylindrical side wall of the upper part 1A of the exterior housing 1 is provided, near and along its circular inside edge 21, with at least two rounded shoulders 37 which, according to the embodiment shown, are diametrically opposed.

On the other hand, the sliding bowl 1B is provided with a spring piece made of steel wire 35, fastened by at least two screws 36, forming at least two diametrically opposed hooking tabs 38 extending perpendicularly to its axis, and the free ends of which, essentially in the shape of a U, serve as locking pins 39.

During the rotation of the sliding bowl 1B following its axis, the locking pins 39 come to rest on the shoulders 37 which limits the movement of translation of said sliding bowl with respect to the upper part 1A of the exterior housing 1.

A stop 40 located at one of the ends of each shoulder 37 limits the rotational movement of the locking pins 39 during the placement of the sliding bowl 1B in the assembly position.

On the other hand, the locking pins 39 and the inside face of the upper part 1A of the exterior housing 1 are provided with complementary locking means at the end of the rotational movement, during the assembly of parts 1A and 1B of the exterior housing 1. This means may be constituted by the diametrically opposed U shape of the locking pins 39 and by pins 42, provided inside the exterior house of the upper part 1A of the exterior housing 1, delimiting, with the stop 40, two seats 41 in which said locking pins 39 engage automatically at the end of the rotational movement of assembly.

The invention concerns also portable cutting tools such as grass-cutter, edge cutter, brush cutter, hedge cutter, equipped or likely to be equipped with a cutting head featuring the previously disclosed characteristics.

Figure 13:
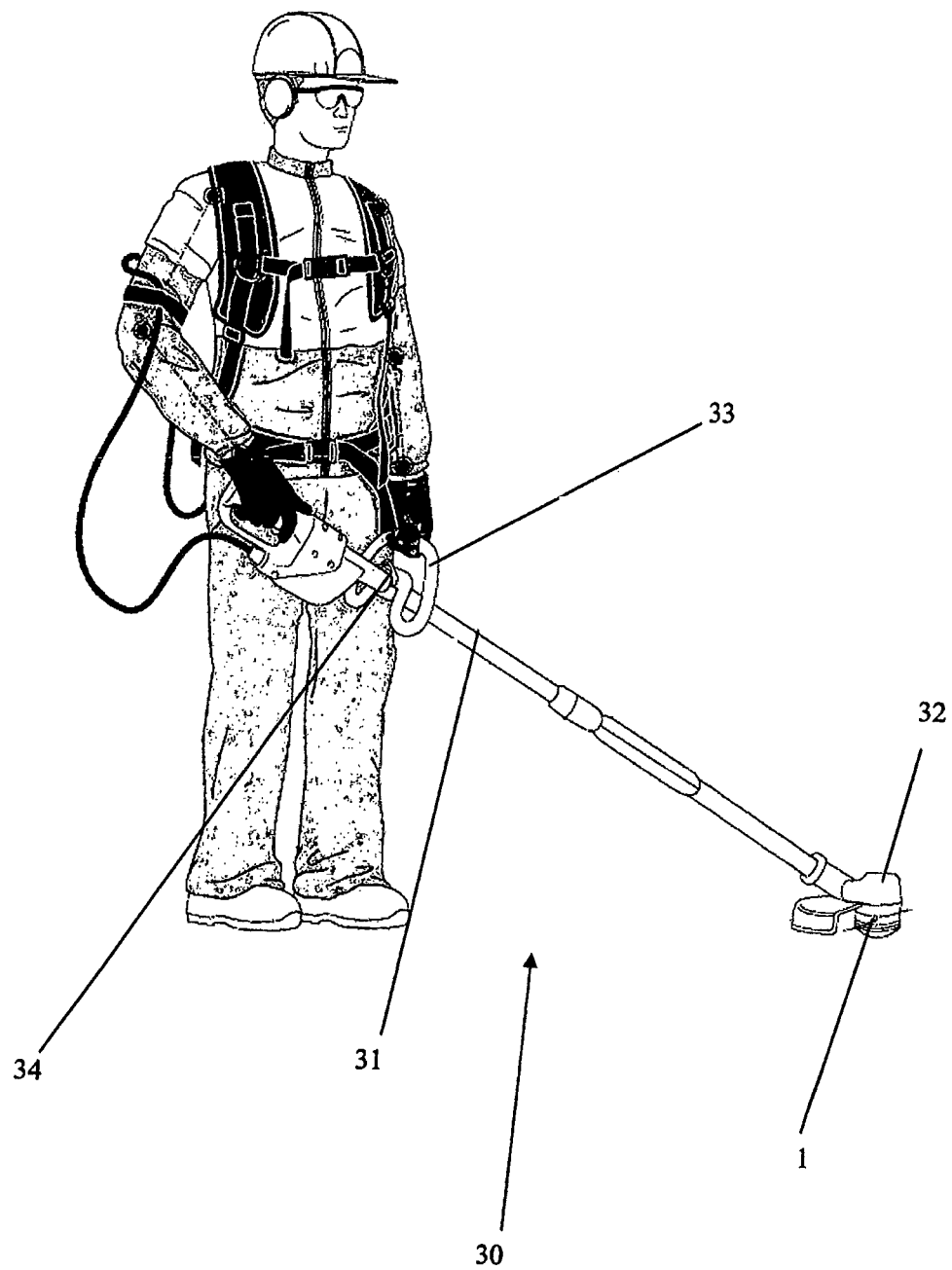
FIG. 13 is a perspective view of a grass cutter equipped with a cutting head using flexible cutting strands according to the invention.

Such devices, an example of which is designated in its entirety by reference 30 in FIG. 13, generally feature: a handle 31 the distal end of which supports a cutting head, a motorization 32 installed at the lower part or at the upper part of the handle for the rotational drive of the cutting head, a U-shaped or dual handle 33 for guidance and control of this motorization, a ring 34 for the fastening of a carrying harness. The motorization for drive of the cutting head may be effected by a thermal engine, an electric motor powered by a portable battery or by connected to the net.

I claim:

1. An apparatus comprising:
   a rotary cutting head adapted to allow flexible strands of cutting wire to be inserted therein such that the strands can extend outwardly of said rotary cutting head, said rotary cutting head having an exterior housing and a rotation axis;
   a means for coupling said rotary cutting head to a drive shaft of a motor;
   a support; and
   a clamping mechanism supported by said support in said rotary cutting head, said clamping mechanism adapted to clamp the strands in said exterior housing, said clamping mechanism rotatable with a rotation of said exterior housing of said rotary cutting head, said clamping mechanism comprising squeezing cams mounted so as to pivot in parallel planes therebetween and parallel relative to said rotation axis of said cutting head, said squeezing cams engageable with the strands, said support being axially translatable in said exterior housing, said exterior housing and said clamping mechanism fitted together in a complementary manner such that a simultaneous application of a relative axial movement in a direction opposite to said exterior housing and to said support cause a raising of said squeezing cams or a lowering of said squeezing cams, the raising of said squeezing cams enabling a positioning or an unwinding or a withdrawal of the strands, the lowering of said squeezing cams causing a blocking of the stands in said cutting head.

2. The apparatus of claim 1, said exterior housing and said support being fitted together such that simultaneous application of axial movement convergent to said exterior housing and to said clamping mechanism causes said squeezing cams to raise and such that simultaneous application of axial movements divergent to said exterior housing and to said support causes said squeezing cams to lower.

3. The apparatus of claim 1, the divergent axial movement being automatic by action of an elastic member.

4. The apparatus of claim 3, said elastic member being a spring acting in compression, said spring interposed between an inner partitioning of said exterior housing and said support.

5. A portable cutting device having the apparatus of claim 1.

* * * * *